(12) United States Patent
Canini et al.

(10) Patent No.: US 8,441,142 B2
(45) Date of Patent: May 14, 2013

(54) BEARING DEVICE FOR A WIND TURBINE NACELLE

(75) Inventors: Jean Marc Canini, Aibes (FR); Bernard Claude Lhenry, Le Creusot (FR)

(73) Assignee: DDIS, S.A.S., Anzin (FR)

( * ) Notice: Subject to any disclaimer, the term of this patent is extended or adjusted under 35 U.S.C. 154(b) by 414 days.

(21) Appl. No.: 12/934,527

(22) PCT Filed: Mar. 24, 2009

(86) PCT No.: PCT/FR2009/050501
§ 371 (c)(1),
(2), (4) Date: Sep. 24, 2010

(87) PCT Pub. No.: WO2009/125121
PCT Pub. Date: Oct. 15, 2009

(65) Prior Publication Data
US 2011/0042960 A1    Feb. 24, 2011

(30) Foreign Application Priority Data
Mar. 26, 2008    (FR) ...................................... 08 51914

(51) Int. Cl.
*F03D 9/00*    (2006.01)
*H02P 9/04*    (2006.01)
(52) U.S. Cl.
USPC ............................................ 290/55; 290/44
(58) Field of Classification Search .................... 290/44, 290/55
See application file for complete search history.

(56) References Cited

U.S. PATENT DOCUMENTS

| | | | | |
|---|---|---|---|---|
| 2,026,828 A * | 1/1936 | Dunn | ............................... | 290/55 |
| 2,048,732 A * | 7/1936 | Dunn | ............................... | 290/55 |
| 2,052,816 A * | 9/1936 | Dunn | ............................... | 290/55 |
| 2,055,012 A * | 9/1936 | Jacobs | ............................ | 290/55 |
| 2,094,917 A * | 10/1937 | Dunn | ............................... | 290/55 |
| 2,140,152 A * | 12/1938 | Dunn | ............................... | 290/55 |
| 2,204,462 A * | 6/1940 | Albers | ........................... | 290/55 |
| 2,207,964 A * | 7/1940 | Albers | ........................... | 416/13 |
| 2,245,264 A * | 6/1941 | Dunn | ............................... | 290/55 |
| 2,484,291 A * | 10/1949 | Hays | ............................. | 417/336 |
| 4,435,646 A * | 3/1984 | Coleman et al. | ................ | 290/44 |
| 4,449,889 A * | 5/1984 | Belden | ........................... | 416/16 |
| 4,522,561 A * | 6/1985 | Carter et al. | .................... | 416/11 |

(Continued)

FOREIGN PATENT DOCUMENTS

EP    1 291 521 A1    3/2003
EP    1 985 846 A1    10/2008

(Continued)

*Primary Examiner* — Pedro J Cuevas
(74) *Attorney, Agent, or Firm* — Kenyon & Kenyon LLP

(57) ABSTRACT

The present invention relates to a wind turbine nacelle. This nacelle comprises a body, and a head. The body comprises a base which is designed to be fastened to the upper end of a wind turbine tower, and a tubular chamber which upwardly extends said base along a vertical axis. The head comprises a cavity which is designed for rotationally mounting blades and for accommodating a generator, and by a shroud which is secured to the cavity and arranged along a vertical axis so as to be pivotally mounted on the tubular chamber. Furthermore, the nacelle comprises pivot connection means which are arranged between the shroud and the tubular chamber and allow the head to be pivotally mounted on the body. Another aspect of the present invention concerns a wind turbine equipped with such a wind turbine nacelle.

16 Claims, 5 Drawing Sheets

U.S. PATENT DOCUMENTS

| | | | | |
|---|---|---|---|---|
| 4,522,564 A * | 6/1985 | Carter et al. | | 416/140 |
| 4,545,728 A * | 10/1985 | Cheney, Jr. | | 416/11 |
| 4,557,666 A * | 12/1985 | Baskin et al. | | 416/32 |
| 4,565,929 A * | 1/1986 | Baskin et al. | | 290/44 |
| 4,767,939 A * | 8/1988 | Calley | | 290/55 |
| 5,178,518 A * | 1/1993 | Carter, Sr. | | 416/11 |
| 5,295,793 A * | 3/1994 | Belden | | 416/13 |
| 5,354,175 A * | 10/1994 | Coleman et al. | | 416/9 |
| 5,746,576 A * | 5/1998 | Bayly | | 416/16 |
| 6,327,957 B1 * | 12/2001 | Carter, Sr. | | 91/41 |
| 6,974,307 B2 * | 12/2005 | Antoune et al. | | 416/9 |
| 6,979,175 B2 * | 12/2005 | Drake | | 416/11 |
| 7,528,497 B2 * | 5/2009 | Bertolotti | | 290/55 |
| 8,197,208 B2 * | 6/2012 | Sharples et al. | | 416/85 |
| 8,246,302 B2 * | 8/2012 | Bertolotti | | 416/1 |
| 2004/0076518 A1 * | 4/2004 | Drake | | 416/10 |
| 2008/0012346 A1 * | 1/2008 | Bertolotti | | 290/55 |
| 2012/0228881 A1 * | 9/2012 | Siegfriedsen | | 290/55 |

FOREIGN PATENT DOCUMENTS

| | | |
|---|---|---|
| FR | 2 810 374 A1 | 12/2001 |
| WO | 2005/107425 A2 | 11/2005 |
| WO | 2006/032515 A1 | 3/2006 |
| WO | 2007/125349 A2 | 11/2007 |

* cited by examiner

BEARING DEVICE FOR A WIND TURBINE NACELLE

This is a 371 national phase application of PCT/FR2009/050501 filed 24 Mar. 2009, claiming priority to French patent application Ser. No. 08/51914 filed 26 Mar. 2008, the contents of which are incorporated herein by reference.

FIELD OF THE INVENTION

The present invention relates to a wind turbine nacelle. It thus relates more particularly to the field of wind turbines.

BACKGROUND OF THE INVENTION

Application of the invention lies with providers and operators of renewable energy and with installers of wind farms whether on dry land or off-shore.

The wind turbine nacelle of the invention is made by wind turbine manufacturers, or more generally by metal workers and/or mechanical welding businesses.

A wind turbine comprises in particular a tower, often also called a mast, a nacelle arranged at the top end of the tower, blades, and an alternator, said blades serving, under drive from the wind, to drive the rotor of the alternator in order to generate electricity. The blades and the alternator are arranged on the nacelle, which also includes other component elements of the wind turbine, in particular a system for braking the blades, and speed-increasing gearing.

Amongst wind turbines, there are upwind turbines; upwind turbines are constituted by blades located in a plane that is more or less vertical and designed to be exposed to face the oncoming wind directly. For this purpose, the wind turbine is fitted with an anemometer for monitoring the direction of the wind and a system for steering the nacelle that enables the direction in which the blades face to be modified depending on the measurements performed by the anemometer.

In the known prior art, the nacelle comprises a base and a head secured to the base. The head includes the alternator and the other component elements of the wind turbine, as mentioned above. In addition, it rotatably receives a hub that is secured to the rotor of the alternator and on which the blades are distributed.

The base is also mounted to pivot on the top end of the tower. This pivot mounting is achieved by means of a bearing laid flat on the top end of the tower, which bearing receives said base of the nacelle. By way of example, the bearing may be of the type comprising a ball slewing ring capable of supporting the combined loads exerted by the nacelle resting on the top end of the tower. This stewing ring allows the nacelle to pivot about a vertical axis corresponding to the vertical axis of the tower.

Furthermore, the system for steering a nacelle on the tower is arranged between the top end of said tower and the base of the nacelle, which nacelle incorporates the component elements of the steering system.

Such a design of wind turbine suffers from the drawback of requiring both the base of the nacelle and the top end of the tower that is to receive the ring to present excellent planeness so as to be able to receive between them the ball slewing ring.

In the known prior art, document WO 2007/125349 discloses a wind turbine having a nacelle mounted at the top end of a tower. The nacelle comprises a body and a head. The body has a conical top end that is extended upwards by a tubular chamber, said body being received via rolling bearings in a reception zone that is of shape complementary to said body and that is arranged at the end of the tower. The head comprises firstly a dish that enables blades to be mounted to rotate about an axis that is more or less horizontal and that serves to receive an alternator, and secondly a shaft that extends downwards and that is received in the tubular chamber of the body. A pivot connection constituted by the bearing is arranged between said shaft and said tubular chamber. Such a design presents the drawbacks of requiring the use of a tower that is designed specifically to receive such as nacelle. Such a design also increases the cost of making the tower so that it can receive the nacelle.

SUMMARY OF THE INVENTION

An object of the present invention is to mitigate those drawbacks. It is capable of accommodating the cantilevered-out loading that results from the weight of the upwind alternator while also enabling conventional towers to be used, and without increasing the cost of building such towers. The nacelle design of the present invention also presents the advantages of reducing the cost of fabrication and of enabling it to be installed on existing wind turbines as a replacement nacelle, the nacelle of the present invention being very easily fitted to various types of tower by clamping means.

In this respect, the invention relates to a wind turbine nacelle arranged to be assembled on the top end of a tower and to support the component elements of said wind turbine, in particular an alternator and blades mounted to rotate and driving the rotor of the alternator.

The nacelle comprises a body constituted by a base suitable for being fastened to the top end of the tower. In addition, the base also includes a tubular chamber extending said base upwards along a vertical axis.

The nacelle also has a head constituted by a dish and a bushing. The dish is arranged for mounting the blades to rotate about a defined axis that is more or less horizontal and for receiving the alternator. The bushing is secured to the dish and is arranged about a vertical axis for pivotally mounted on the tubular chamber of the body.

In addition, the nacelle includes pivot connection means arranged between the bushing and the tubular chamber, these pivot connection means enabling the head to be pivotally mounted on the body.

Such a design makes it possible to avoid the drawbacks of prior art nacelles, in particular implementing a tower presenting excellent planeness at its end for the purpose of receiving said nacelle. In addition, it can be fitted to any traditional type of tower merely by fastening the nacelle to the end of said tower.

Furthermore, the nacelle design of the invention presents the advantage of enabling forces to be shared directly over the nacelle between the bushing and the tubular chamber.

Another aspect of the present invention provides a wind turbine comprising a tower extending vertically, a wind turbine nacelle of the invention, blades, and an alternator arranged in the dish of the head, with the base of the body being fastened on the top end of the tower.

BRIEF DESCRIPTION OF THE DRAWINGS

The characteristics and advantages of the present invention appear on reading the following description of a preferred design of the nacelle, the description making reference to figures, in which.

DETAILED DESCRIPTION

Figure 1:
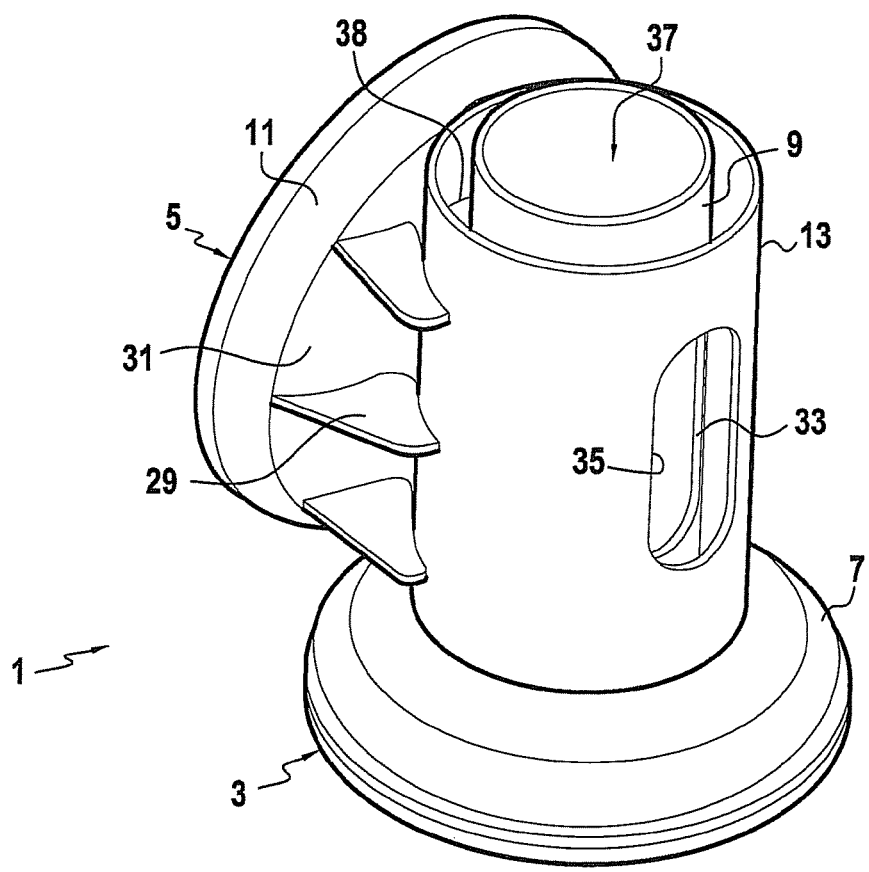
FIG. 1 is a perspective view of a first design of the wind turbine nacelle of the invention.

As shown in FIG. 1, the wind turbine nacelle 1 of the invention comprises a body 3 and a head 5. The body is constituted by a base 7 and a tubular chamber 9 extending upwards along a vertical axis $X_1$ of said base 7. The head 5 is constituted by a dish 11 and a bushing 13. The bushing 13 is secured to the dish 11, said bushing being arranged on a vertical axis so as to be pivotally mounted on the tubular chamber 9 of the body 3. For this purpose, the bushing 13 has an inside diameter $D_1$ and the tubular chamber has an outside diameter $D_2$, with the inside diameter $D_1$ being greater than the outside diameter $D_2$, thereby enabling the bushing to be engaged on the tubular chamber.

In addition, the nacelle has pivot connection means arranged between the bushing 13 and the tubular chamber 9, the pivot connection means enabling the head 5 to be pivotally mounted on the body 3.

These pivot connection means are constituted by two bearings 15, 17 arranged between the inside diameter $D_1$ of the bushing 13 and the outside diameter $D_2$ of the tubular chamber 9. These two bearings 15, 17 are designed to support the radial loads exerted by the bushing on the tubular chamber. Such radial loads arise, amongst other reasons, as a result of the blades of wind turbine rotating, and as a result of the thrust exerted by the wind on said blades.

Figure 2:
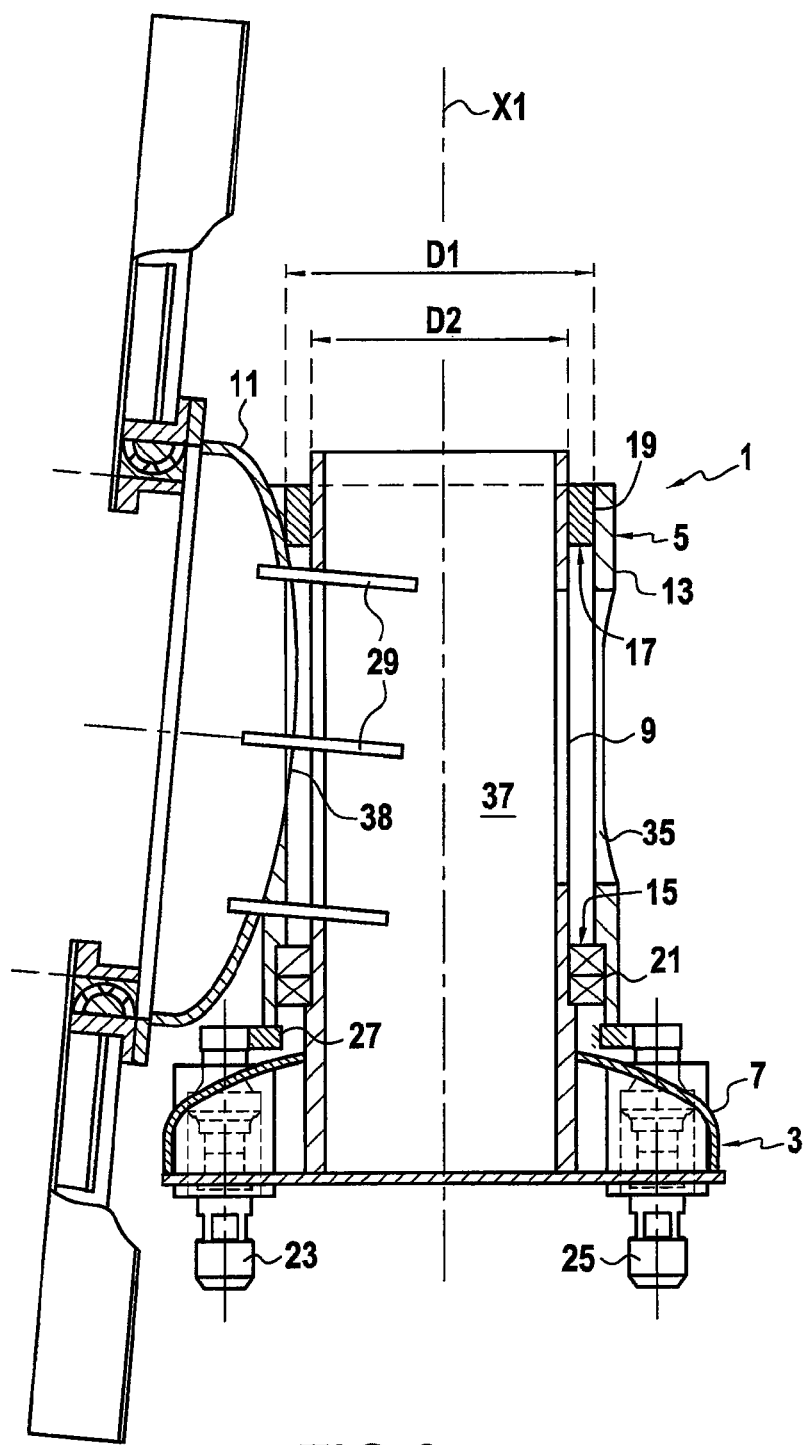
FIG. 2 is a section view of the component elements of the FIG. 1 nacelle.

These bearings 15, 17 are arranged on the inside at the top and bottom ends 19 and 21 of the bushing 13, as can be seen in FIG. 2. Furthermore, the bearing 17 arranged at the top end 19 is constituted by a bearing with a brake shoe having the function of slowing down and braking the head 5 of the nacelle relative to the body 3 during turning thereof. In addition, the bearing 15 arranged at the bottom end 21 is constituted by a rolling bearing suitable for transferring both radial and axial loads. The arrangement of the bearings at the top and bottom ends of the bushing 13 serves to optimize the distribution of loads. In preferred manner, the rolling bearing 15 is constituted by a bearing having balls or conical rollers. Furthermore, it is possible to envisage interchanging the bearings 15, 17.

Figure 3:
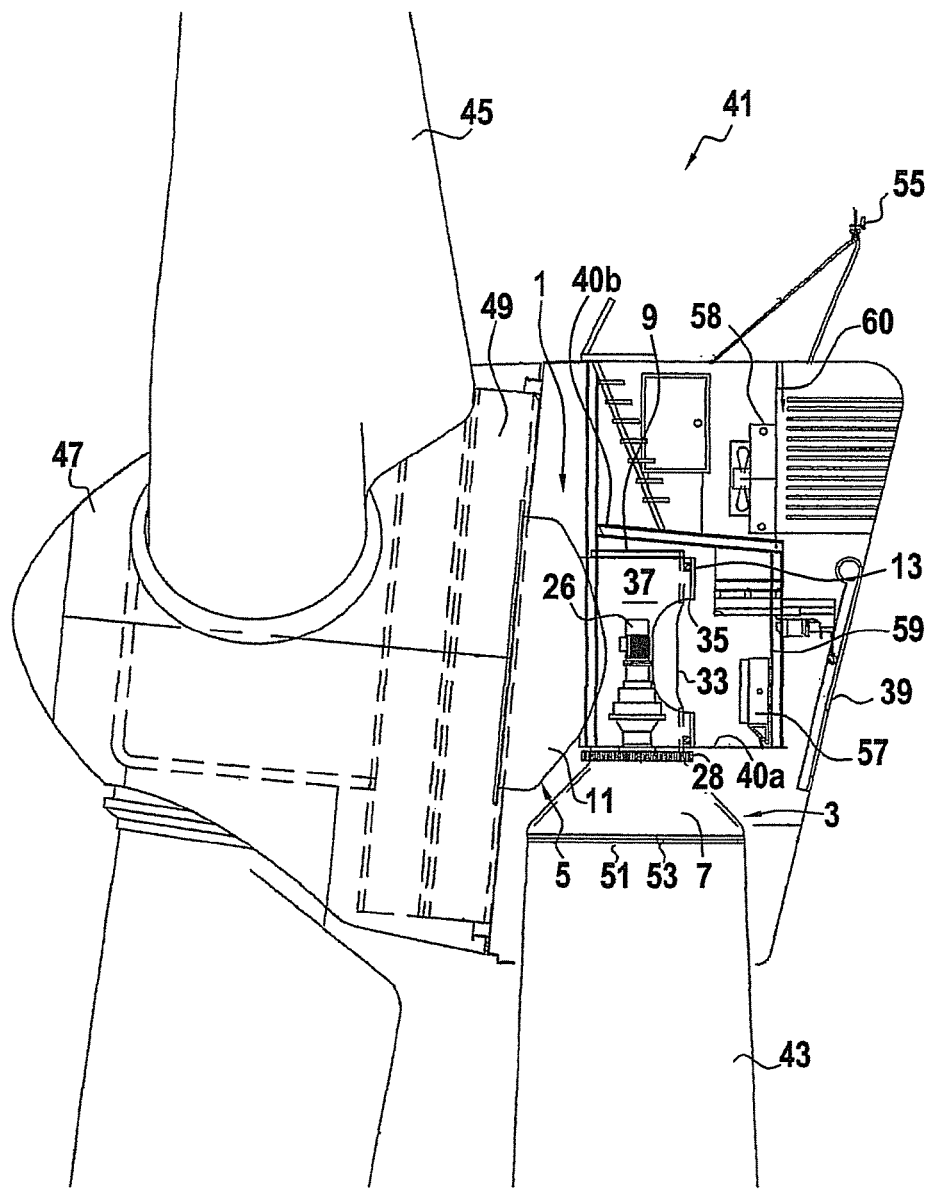
FIG. 3 shows a wind turbine fitted with the FIG. 1 nacelle.

As shown in FIGS. 1 and 2, the nacelle 1 has a steering system enabling the head 5 to be turned relative to the body 3. This steering system is arranged between the base 7 of the body and the bottom end of the bushing 13. It preferably comprises two motors 23, 25 symmetrically distributed on the base 7, as shown in FIG. 2. These motors 23, 25 are preferably incorporated in part inside the base 7. These motors 23, 25 mesh with an external ring gear 27 arranged at the bottom end of the bushing 13. Nevertheless, it is possible to envisage having a single motor 26, as shown in FIG. 3, arranged inside the tubular chamber 9 and meshing with an internal ring gear 28 arranged on the bushing 13. It is also possible for the number is of motors to be greater than two, depending on the dimensions and the power of the wind turbine; under such circumstances, the motors are distributed uniformly around the bushing 3.

In preferred and non-limiting manner, the base 7 of the body 3 has a corolla or domed shape. Similarly, the dish 11 of the head 5 has a corolla or domed shape. This domed-bottom shape serves in particular to make it easier to incorporate the component elements of the wind turbine, as described below.

In addition, the head 5 has reinforcing parts 29 arranged between the dish 11 and the bushing 13, as shown in FIGS. 1 and 2. These reinforcing parts 29 are distributed uniformly on either side of the bushing and they are welded between the outside face of the bushing and the rear face 31 of the dish 11. Such reinforcing parts serve to reinforce the structure of said head 5, which is subjected to high levels of stress during rotation of the blades of the wind turbine.

As shown in FIGS. 1 to 3, the tubular chamber 9 of the body 3 includes a slot 33. Similarly, the bushing 13 includes a slot 35 of shape and position that are substantially identical to the shape and position of the slot in the tubular chamber 9. Thus, during turning of the bushing 13 on the tubular chamber 9, the two slots 33 and 35 can come into coincidence with each other, thereby having a function of providing access to the inside 37 of the tubular chamber, which may contain component elements of the wind turbine, such as the motors of the steering system, and electrical cabinets, or a controller for controlling said elements of the wind turbine.

In preferred and non-limiting manner, the common portion of the rear face 31 of the dish 11 in contact with the bushing 13 has an opening 38, shown in FIGS. 1 and 2, giving access to the inside of said dish 11 from inside said bushing 13 for maintenance operations on the alternator and on the hub supporting the blades of the wind turbine, which elements are described below. An operator penetrates initially into the inside 37 of the tubular chamber 9 as mentioned above; then, for example, by turning the head 5 through half a turn relative to the body 3, the slot 33 of the tubular chamber 9 is made to coincide with the opening 38 leading to the dish 11, thereby enabling said operator situated inside the tubular chamber 9 to access said opening 38.

In addition, the nacelle preferably includes a ladder installed on the inside 37 of the tubular chamber 9 to give access to a top level, as described above, by passing through the top end of said tubular chamber 9.

The nacelle includes a cabin 39, shown in FIG. 3, this cabin being secured to the bushing 13 and being located opposite from the dish 11, also fastened to the bushing 13. The cabin 39 communicates with the slot in the bushing. It also has the function of receiving component elements of the wind turbine and of giving people access, in particular for maintenance operations. The cabin 39 preferably includes a bottom floor 40a and a top floor 40b, shown in FIG. 3. By way of example, the bottom floor 40a is arranged level with the bottom end of the bushing 13. By way of example, the top floor 40b is arranged level with the top end of the tubular chamber and it is provided with an opening communicating with said top end of the tubular chamber so as to give access to the inside 37 thereof.

FIG. 3 shows a wind turbine 41 constituted by a nacelle 1 of the invention. The wind turbine has a tower 43, also known as a mast, that extends vertically, with the height of the tower depending essentially on the power of the wind turbine and of the blades arranged thereon.

On this topic, FIG. 3 shows the blades 45, preferably three in number, that are arranged on a hub 47 presenting a streamlined nose. The wind turbine has an alternator 49 serving to generate alternating current (AC). The alternator is incorporated inside the hub 47 and it is fastened inside the dish 11 of the head 5 of the nacelle so as to move in rotation therewith, as shown in FIG. 3.

Furthermore, the hub 47 is secured to the rotor of the alternator 49, with rotation of the blades and of the hub as generated by the action of the wind serving to drive rotation of the alternator rotor and generate electricity. The diameter of the dish 11 is thus dimensioned as a function of the diameter of the alternator 49 and of the diameter of the elements of the hub 47, depending on the elements that said dish supports and depending on the design of the alternator. In this respect, it is preferable to select an alternator made up of an external rotor that surrounds the stator symmetrically. The way the hub supporting the blades is assembled with the alternator on the dish enables these elements to be mounted to rotate about a defined axis that is more or less horizontal.

The base 7 of the body 3 presents a diameter at its end that corresponds to the diameter of the top end 51 of the tower 43. This base rests on the top end of the tower and it is fastened thereto. In preferred and non-limiting manner, this fastening is provided by clamping together flanges 53 of these two elements.

The wind turbine 1 includes other elements, that are also to be found in wind turbines of the prior art, in particular an anemometer 55 mounted on the cabin 39 that is arranged on the nacelle 1, as described above. The anemometer is mounted on the top rear portion of said cabin 39. The anemometer 55 serves to measure the wind and its direction. The anemometer is connected to a controller 57 that, amongst other things, controls the steering system by acting on the motors to turn the head 5 relative to the body 3 so as to change the position of the blades 45 and place them facing the wind. Other elements or accessories are included in the cabin 39, such as power converters and cooling units 58. By way of example, these various elements or accessories are arranged on the bottom and top floors 40a and 40b or on the inside walls 59, 60 of said cabin 39.

It can be understood that fastening the base of the nacelle on the top end of the tower makes it possible to avoid the needs for planeness as required in the past on prior art wind turbine towers where it is the base that is movable relative to said tower.

Furthermore, the technical characteristics described for the design of the nacelle 1 and the wind turbine 41 fitted with such a nacelle 1, as shown in FIGS. 1 to 3, remain applicable to all variants of that design, without going beyond the ambit of the present invention.

Other variants may also be envisaged without going beyond the ambit of the invention. Thus, FIGS. 4 to 7 show a variant nacelle 101 in which the body 103 comprises firstly a base 107 of circular shape that preferably extends inwards in a horizontal plane as shown in FIGS. 5 to 7, said base 107 being arranged to be clamped to the top end of the tower of a wind turbine similar to that shown in FIG. 3, and secondly a tubular chamber 109 extending upwards from the base 107 with its top end receiving an internal ring gear 127, as shown in FIGS. 5 and 6. In addition, the head 105 of the nacelle 101 includes a dish 111 and a bushing 113 with reinforcement 129 provided therebetween. The bushing 113 is subdivided into two compartments, namely a bottom compartment 113a and a top compartment 113b. The tubular chamber 109 is engaged in the bottom compartment 113a, with pivot connection means being arranged between the bottom compartment 113a of the bushing and the tubular chamber 109.

Figure 4:
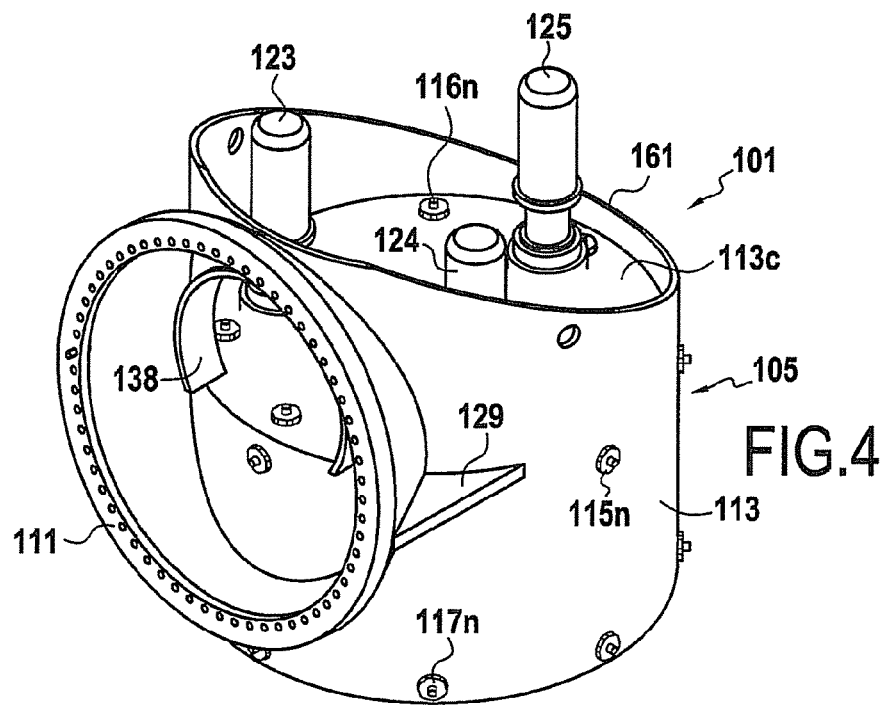
FIG. 4 is a perspective view, partially in section, showing a variant design of the nacelle of the invention.
Figure 5:
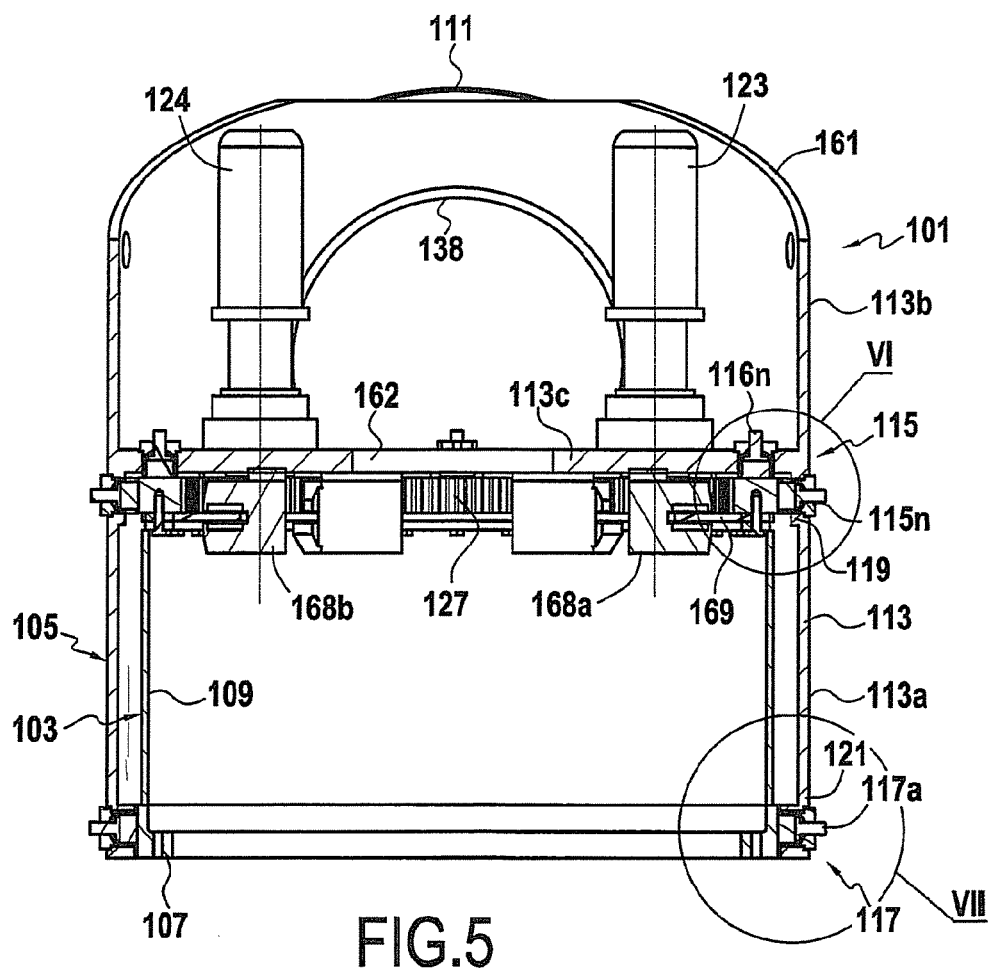
FIG. 5 is a rear section view of the FIG. 4 nacelle.
Figure 6:
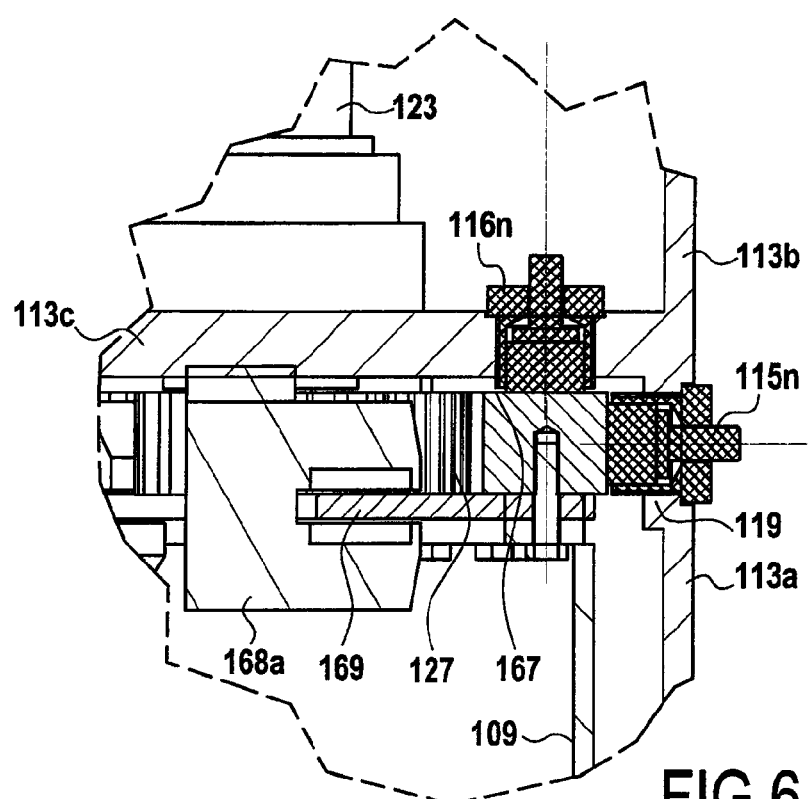
FIGS. 6 and 7 are two projections showing details VI and VII of FIG. 5.
Figure 7:
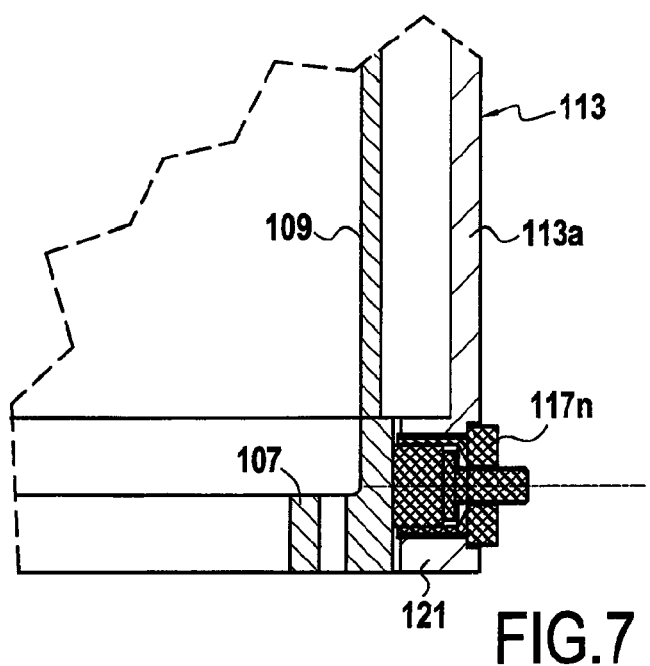

In preferred manner, in this variant nacelle 101, three motors 123, 124, and 125 are distributed uniformly and engage the internal ring 127, as shown in FIGS. 4 to 6, together constituting a system for steering the head 105 relative to the body 103. These motors 123, 124, and 125 are housed in the top compartment 113b of the bushing 113, as shown in FIG. 4, and they are mounted directly on the separator wall 113c separating the bottom compartment 113a and the top compartment 113b.

Furthermore, in this variant nacelle 101, the dish 111 has an opening 138, as shown in FIGS. 4 and 5, communicating with the top compartment 113b of the bushing 113, thereby giving to the inside of said dish 111. In order to facilitate access via the opening 138 to the elements of the alternator of the wind turbine, the top end 161 of the top compartment 113b of the bushing 113 presents a chamfered shape in section, as can be seen in FIGS. 4 and 5. In addition, the separation wall 113c between the bottom compartment 113a and the top compartment 113b includes an opening 162, shown in FIG. 5, giving access to said bottom compartment 113a, in particular for maintenance operations on the internal ring 127 and the pinions of the motors 123, 124, and 125 meshing with said internal ring gear 127.

In this variant embodiment of the nacelle 101, the pivot connection means between the tubular chamber 109 and the bottom compartment 113a of the bushing 113 are provided by bearings 115, 117 arranged between the inside diameter of the bottom compartment 113a of the bushing 113 and the outside diameter of the tubular chamber 109 level with the top and bottom ends 119 and 121 of said bottom compartment 113a, as shown in FIGS. 4 to 7. These bearings 115, 117 are constituted by shoes 115n, 117n shown in detail in FIGS. 6 and 7 that are distributed uniformly around the bushing level with the top and bottom ends 119 and 121, as shown in FIG. 4. Each bearing 115 and 117 is preferably constituted by eight shoes 115n, 117n that are uniformly distributed.

Likewise, as shown in FIG. 6, shoes 116n similar to the shoes 115n, 117n are also provided; these shoes 116n are secured to the separator wall 113c and they bear against the top end of the tubular chamber 109 either directly or indirectly via the internal ring gear 127, said shoes 116n then bearing against the top face 167 of said internal ring gear 127. These shoes 116n are preferably eight in number and uniformly distributed around the separator wall 113c of the bushing 113, as shown in FIG. 4. Thus, the bushing 113 of the head 105 rests on the tubular chamber 109 of the body 103.

Preferably, such shoes 115n, 116n, and 117n are of the trademark Eternum®. Furthermore, such shoes 115n, 116n, and 117n may be envisaged for the nacelle 1 shown in FIGS. 1 to 3.

Such a pivot connection presents the advantage of avoiding the use of rolling bushings, which are expensive, and ensures long life for the pivot connection implemented between the bushing 113 and the tubular chamber 109.

In this variant nacelle 101, a braking system is arranged between the separator wall 113c of the bushing 113 and the top end of the tubular chamber 109. The braking system is preferably constituted by a brake caliper 168a, 168b secured to the bottom face 166 of the separator wall 113c and a brake disk 169 secured to the top end of the tubular chamber 109, as shown in FIGS. 5 and 6. It is nevertheless possible for other embodiments to be envisaged for the braking system between the bushing 113 and the tubular chamber 109.

Naturally, the nacelle 101 shown in FIG. 4 has a cabin secured to the bushing 113 and may be installed on the wind turbine 47 as shown in FIG. 3.

The invention claimed is:

1. A wind turbine nacelle arranged to be assembled on the top end of a tower and to support the component elements of said wind turbine, comprises at least blades and an alternator, wherein the nacelle comprises:
   a) a body comprising a base suitable for being fastened on said top end of the tower and a tubular chamber extending upwards along a vertical axis of said base;
   b) a head comprising a dish and a bushing, said dish being designed for rotationally mounting blades on an axis that is more or less horizontal and for accommodating an alternator, said bushing being secured to the dish and being arranged about a vertical axis so as to be pivotally mounted on the tubular chamber; and c) a pivot mechanism arranged between the bushing and the tubular chamber to allow the head to be pivotally mounted on the body.

2. A wind turbine nacelle according to claim 1, wherein the bushing has an inside diameter and the tubular chamber has an outside diameter with the pivot mechanism comprising two bearings arranged between said inside diameter and said outside diameter.

3. A wind turbine nacelle according to claim 2, wherein the bearings are arranged on the inside at the top and bottom ends of the bushing.

4. A wind turbine nacelle according to claim 3, wherein one of the bearings is a ball bearing and the other bearing is a brake shoe bearing.

5. A wind turbine nacelle according to claim 2, wherein each of the tubular chamber and the bushing includes a slot, said slots being suitable for coming into contact depending on the orientation of said bushing relative to said tubular chamber.

6. A wind turbine nacelle according to claim 5, wherein the common portion between the rear face of the dish and the bushing includes an opening suitable for coming into contact with the slot in the tubular chamber depending on the orientation of the bushing relative to said tubular chamber.

7. A wind turbine nacelle according to claim 2, wherein the bearings are arranged at the top and bottom ends of a bottom compartment of the bushing.

8. A wind turbine nacelle according to claim 7, wherein the bearings comprise shoes uniformly distributed around the bushing.

9. A wind turbine nacelle according to claim 7, wherein an opening gives access to the inside of the dish, said opening communicating with a top compartment of the bushing.

10. A wind turbine nacelle according to claim 9, wherein the bottom and top compartments of the bushing are separated by a separator wall having an opening formed therein.

11. A wind turbine nacelle according to claim 10, wherein shoes are arranged between the separator wall and the top end of the tubular chamber.

12. A wind turbine nacelle according to claim 7, wherein a braking system is arranged between the bushing and the tubular chamber.

13. A wind turbine nacelle according to claim 1 further comprising a steering system arranged between the head and the body in order to turn said head relative to said body.

14. A wind turbine nacelle according to claim 1, wherein the head includes reinforcing parts arranged between the dish and the bushing.

15. A wind turbine comprising at least a vertically-extending tower, a nacelle according to claim 1, blades, and an alternator arranged in the dish of the head, the base of the body being fastened to the top end of the tower.

16. A wind turbine according to claim 15, wherein the base of the body is fastened to the top end of the tower by clamping said elements together.

* * * * *